Patented May 2, 1944

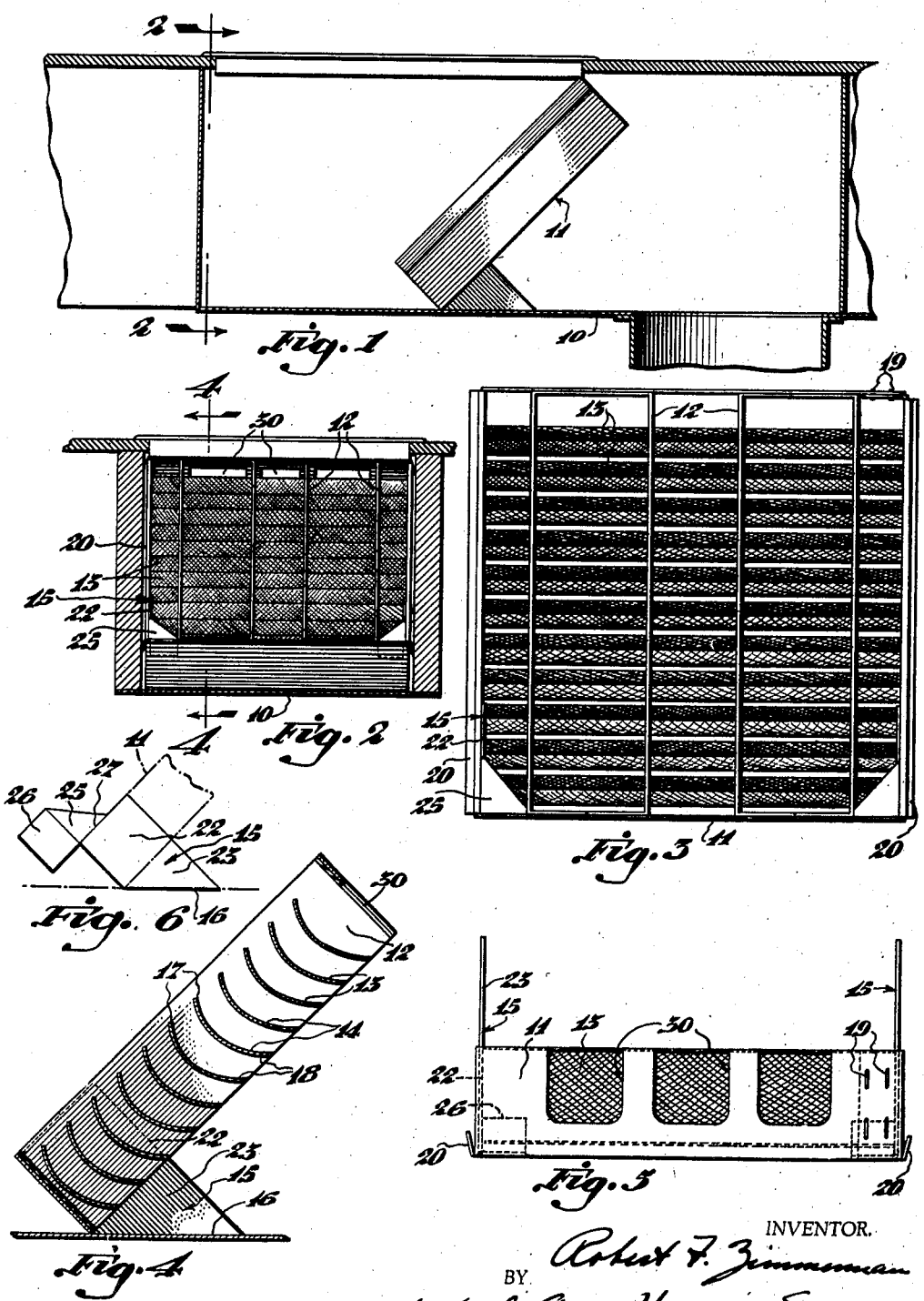

2,348,163

UNITED STATES PATENT OFFICE 2,348,163

AIR FILTER

Robert F. Zimmerman, Cincinnati, Ohio

Application August 18, 1941, Serial No. 407,253

1 Claim. (Cl. 183—112)

This invention relates to air cleaners or filters of the type adapted for use in conduits or ducts through which a stream of air passes, as for example, in convector heating systems either gravity furnaces or convector radiators. More particularly, the invention relates to a filter adapted especially for use in systems wherein the air flows at relatively low velocity. Attention is directed to the patent to Heath No. 1,796,946, granted March 17, 1931, pertaining to an air cleaner adapted for use in a conduit. It is to the improvement of the type of device shown in the Heath patent that the present invention is directed.

The removal or replacement of filters of the type used in the cold air return or intake ducts of the average household heating plant presents a difficult problem. Access and removal must be relatively easy and it is much preferred that the filters be of the throw-away type; for cleaning and reuse of the filtering elements are usually not practical.

The present inventor has had the objective of providing a filter which is unitary and compact, which is easily inserted in the duct, and which when inserted acts efficiently in the cleansing of the air. It is preferable to place the unit at a point in the duct or air-flow passageway where it will have the additional action of changing the direction of air flow, as at a bend. Quite obviously, in any duct there are a certain number of bends which provide places at which the filters are best placed.

It has been a further object of the present inventor to provide a unitary filter of this type which includes a structure compelling all of the air passing in the duct to flow into contact with the cleaning vanes, and means permitting ready mounting of the unit in the duct in the correct position; that is, somewhat in the nature of a stand disposing the unit at the correct angle.

In the broader sense, it has been the further object of the present inventor to provide a filter unit which employs filtering vanes which have an extremely high efficiency in the removal of dust or dirt from the air and which will not collapse or become displaced or torn under the normal flow of air in a low velocity system. More specifically, it has been the object here to provide for the use of vanes formed merely of lengths of matted or woven fiber glass or the like. It has been determined that these strips, due to the loose weave, provide a very high dust-collecting efficiency. The material provides a large area of exposed surface because of the provision of the fine fibers. More than this, due to their characteristic of roughness or shagginess, they are admirably suited to a collection of dust. The air impinging on these vanes tends to dispose the dust or dirt on them much more easily, and the efficiency of this type of filter has been greatly increased as a result of the discovery of the value of this use of fiber glass.

Other objects relate to the formation of the frame of the unit from an inexpensive material such as heavy paper. It has been a further object to adapt this principle of construction and use to the several locations required to filter air in heating systems employing either registers or radiators.

Other objects and certain advantages will be more fully apparent from a description of the drawing in which:

Figure 1 is a sectional view taken longitudinally through an intake conduit showing an air filter of the present invention in position therein.

Figure 2 is a sectional view taken on line 2—2, Figure 1 further illustrating the installed filter.

Figure 3 is a front view looking directly into the filter.

Figure 4 is a sectional view taken on line 4—4, Figure 2 detailing the arrangement of the vanes.

Figure 5 is a top plan view of the filter shown in the previous figures illustrating the clearance openings for preventing pocketing of air in the corner formed when the filter is in position.

Figure 6 is a fragmentary diagrammatic view illustrating the blank making up a leg structure of the filter of Figures 1 to 5 inclusive showing it prior to being folded and positioned in the frame.

The air filter disclosed here is adapted to be used in any air conduit at the point or points where the conduit makes a bend. Thus, the filter has utility in cold air intake conduits in homes, in hot-air registers, in the conduits of air conditioning and ventilating systems, and in hot-air outlets in walls. In fact, the filter may be installed at any bend in a confined column of moving air or other gas for removing dust and foreign particles.

The filter is a unit complete in and of itself. It includes a plurality of laterally curved vanes which are mounted in an inexpensive frame. The frame is mounted in the air conduit at a point where the conduit makes a bend, with the curved vanes so positioned that their curvature corresponds to the path the air must take in making the bend. The curved vanes, thus positioned, assist rather than restrict the flow of air in making the change of direction of movement. The centrifugal force set up in the change of direction of movement forces the dust particles against one or the other of the vanes. The vanes thus collect the dust and dirt without impeding the flow of air.

The filter may also be installed at an outlet point where it is desired to change the direction of the flow of air. In this way the filter serves as a deflector while cleansing the air. The present filter, therefore, may be used as a filter and heat deflector in such places as above a steam radiator or beneath a floor register.

In Figure 1 of the drawing a filter, embodying the present invention, is shown installed in a cold air return duct or down-draft conduit 10 of a hot air furnace heating system. The filter comprises, generally, a rectangular frame 11, vane support members 12 fixed in the frame, and a plurality of vane elements 13. The support members 12 extend laterally with respect to the frame. The vanes 13 are supported in slots 14 in the members 12 and extend crosswise of the frame.

As shown in Figure 4, the slots 14, and consequently the vanes 13, are curved or bowed. Legs 15—15 are provided for the filter. These legs have their base edges 16 cut on an angle of approximately 45° relative to the frame so as to cause the unit to stand at an angle; that is, to tilt back as shown in Figure 1.

It will be noted that the leading edge 17 of each vane extends upwardly approximately vertically and that the vane curves down and around in the direction of the flow of air so that the rear edge 18 extends substantially horizontally. The unit is placed in the conduit just below the register with its upper edge lying against the edge of the register. In this way, the column of air is turned smoothly without turbulence or resistance, while the dust and other particles are caught on the filters.

Preferably, the frame 11 is made of heavy paper or cardboard or some other similar inexpensive material. The frame is rectangular and relatively shallow. It may be made from a single strip of material that is overlapped at one corner of the rectangle and glued or clipped as at 19. At the two sides, narrow flaps 20 are bent outwardly and back from the front edge of the frame. These flaps 20 act as adjustable extensions and take up the irregularities in the walls of the conduit in which the filter is installed. They also serve to hold the filter in place against accidental displacement (Figure 2).

Each one of the legs 15—15 includes a portion 22 that is stapled or glued to the inside of the lower end of the side wall of the frame as set up (Figure 4), and a rearwardly extended portion 23, the lower edge 16 of which is cut at an angle as heretofore stated.

Referring to Figure 6, the legs in the blank form include an angular brace element 25 extending from the front edge of the portion 22. The element includes a tab member 26 extending from it at right angles to the leg. When the leg is placed on the frame, the tab 26 is bent upwardly at right angles to the brace element 25 and the brace element then is bent inwardly on the line 27 at right angles to the body of the leg. When the portion 22 of the leg is stapled to the side wall, the tab member 26 lies against the inner side of the bottom wall of the frame. The tab is then stapled to the frame and the member 25 thus provides a corner brace or gusset for the frame.

It may be seen that the leg member may be made as a part of the frame. In this instance, the extended angular portion 23 and the respective brace 25 and tab 26 would extend from the back and front edges of the strip from which the frame is made. It is preferred that the legs be separate pieces so that there be less waste material in the manufacture of the frame.

The vane support members 12 may be made from the same strip material from which the frame is made. In this instance, the strip is formed in a narrow rectangle which is as long as the inside width of the frame. The rectangle thus formed is stapled to the respective top and bottom walls of the frame. Two such rectangles make four supports as shown in Figure 3. The curved slots in which the vanes are supported may be cut by stamping.

As shown in Figure 5, the top wall of the frame is cut out as at 30 so as not to restrict the flow of air when the filter is installed.

Having described my invention, I claim:

An air filter, comprising, a frame of rectangular box-like structure providing side walls and a series of supporting walls extended across and within the box-like structure, said supporting walls being secured to and between opposite side walls, and being disposed parallel with the other side walls, the supporting walls including arcuate slots, the slots in the respective supporting walls being disposed in alignment, a transversely curved filter vane member disposed in each set of aligned slots, and legs for supporting said box-like structure in an inclined position for permitting the passage of air through and against the vanes, whereby said vanes have the action of cleansing and deflecting the air entering one side into a path at right angles to the path of entry as the air leaves the other side.

ROBERT F. ZIMMERMAN.